US012781820B2

(12) United States Patent
Jarman et al.

(10) Patent No.: US 12,781,820 B2
(45) Date of Patent: Nov. 3, 2026

(54) COATING OF A CARBON/CARBON (C/C) DISK PROVIDING OXIDATION PROTECTION AND WEAR IMPROVEMENT

(71) Applicant: Goodrich Corporation, Charlotte, NC (US)

(72) Inventors: Jecee Jarman, Pueblo, CO (US); Virginia Collier, Colorado Springs, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 411 days.

(21) Appl. No.: 18/510,288

(22) Filed: Nov. 15, 2023

(65) Prior Publication Data

US 2025/0154996 A1 May 15, 2025

(51) Int. Cl.

| | |
|---|---|
| ***F16D 69/02*** | (2006.01) |
| ***C04B 41/52*** | (2006.01) |
| ***F16D 55/24*** | (2006.01) |
| ***F16D 65/12*** | (2006.01) |
| *C04B 111/00* | (2006.01) |
| *F16D 69/00* | (2006.01) |

(52) U.S. Cl.

CPC ............ *F16D 69/023* (2013.01); *C04B 41/52* (2013.01); *F16D 55/24* (2013.01); *F16D 65/126* (2013.01); *C04B 2111/00362* (2013.01); *F16D 2069/003* (2013.01); *F16D 2200/0047* (2013.01); *F16D 2250/0046* (2013.01)

(58) Field of Classification Search

CPC ...... F16D 65/126; F16D 65/127; F16D 55/24; F16D 69/023; C04B 41/52; C04B 41/522; C04B 2111/00362

See application file for complete search history.

(56) References Cited

U.S. PATENT DOCUMENTS

| | | | | |
|---|---|---|---|---|
| 4,011,055 | A * | 3/1977 | Hill | F16D 65/126 428/641 |
| 6,254,975 | B1 | 7/2001 | Kayser et al. | |
| 8,021,474 | B2 | 9/2011 | Mazany et al. | |
| 10,184,174 | B2 * | 1/2019 | Cho | C23C 16/045 |
| 11,505,507 | B2 | 11/2022 | Poteet | |
| 12,565,750 | B2 * | 3/2026 | Hampton | E02D 17/04 |
| 12,583,785 | B2 * | 3/2026 | Ding | C03C 8/08 |

(Continued)

FOREIGN PATENT DOCUMENTS

| | | | | |
|---|---|---|---|---|
| EP | 0606851 | | 7/1994 | |
| EP | 3868734 | A1 * | 8/2021 | C04B 41/009 |
| GB | 1544994 | A * | 4/1979 | F16D 65/126 |

OTHER PUBLICATIONS

European Patent Office, European Search Report dated Mar. 18, 2025 in Application No. 24205408.8.

*Primary Examiner* — Thomas J Williams

(74) *Attorney, Agent, or Firm* — SNELL & WILMER L.L.P.

(57) ABSTRACT

A method is provided for providing oxidation protection and wear improvement for a densified carbon/carbon (C/C) friction disk. The method includes applying a first coating to a radially inward non-wear surface and a radially outward non-wear surface of the densified C/C friction disk and applying a second coating to the radially inward non-wear surface, the radially outward non-wear surface, and the wear surfaces of the densified C/C friction disk.

20 Claims, 6 Drawing Sheets

(56) References Cited

U.S. PATENT DOCUMENTS

| | | | | |
|---|---|---|---|---|
| 2015/0240899 | A1* | 8/2015 | Cho | F16D 69/023<br>188/218 XL |
| 2016/0333955 | A1* | 11/2016 | Rowe | B29C 64/112 |
| 2017/0267595 | A1* | 9/2017 | Mazany | C03C 8/24 |
| 2021/0198159 | A1* | 7/2021 | Poteet | C04B 41/52 |
| 2022/0250996 | A1* | 8/2022 | Mehr | C04B 14/4618 |
| 2022/0356123 | A1 | 11/2022 | Khan | |
| 2023/0150884 | A1 | 5/2023 | Khan | |
| 2023/0211875 | A1 | 7/2023 | Poteet et al. | |
| 2025/0154996 | A1* | 5/2025 | Jarman | C04B 41/89 |

* cited by examiner

COATING OF A CARBON/CARBON (C/C) DISK PROVIDING OXIDATION PROTECTION AND WEAR IMPROVEMENT

FIELD

The present disclosure relates generally to aircraft carbon brakes and, more specifically, to providing oxidation protection and wear improvement via coating a carbon/carbon (C/C) disk.

BACKGROUND

Aircraft typically utilize brake systems on wheels to slow or stop the aircraft during landings, taxiing, and rejected takeoffs. The brake systems generally employ a brake stack or heat sink comprising a series of friction disks that may be forced into sliding contact with one another during brake actuation to slow or stop the aircraft. The brake stack typically includes rotor disks and stator disks that, in response to axial compressive loads, convert the kinetic energy of the aircraft into heat through frictional forces experienced between the friction disks.

SUMMARY

A method for providing oxidation protection and wear improvement for a densified carbon/carbon (C/C) friction disk is disclosed. The method includes applying a first coating to a radially inward non-wear surface and a radially outward non-wear surface of the densified C/C friction disk and applying a second coating to the radially inward non-wear surface, the radially outward non-wear surface, and the wear surfaces of the densified C/C friction disk.

In various embodiments, the first coating is a mixture including boron carbide ($B_4C$) powder, surfactants, and a carrier fluid. In various embodiments, the carrier fluid is at least one of water, isopropyl alcohol, or hexane. In various embodiments, the second coating is a mixture including aluminum (Al), silicon (Si), a solvent, and a carrier fluid. In various embodiments, the solvent is at least one of water, methyltrimethoxysilane, hexane, isopropyl alcohol, or polyvinyl alcohol.

In various embodiments, the method further includes applying a third coating to the to the radially inward non-wear surface and the radially outward non-wear surface of the densified C/C friction disk. In various embodiments, the third coating is a mixture of aluminum oxide ($Al_2O_3$) and a carrier fluid.

In various embodiments, the method further includes applying a fourth coating to the radially inward non-wear surface and the radially outward non-wear surface of the densified C/C friction disk. In various embodiments, the fourth coating is a mixture of at least one of a phosphoric acid, an aluminum phosphate, aluminum hydroxide, or aluminum oxide, and the carrier fluid.

In various embodiments, the method further includes applying a fifth coating to the radially inward non-wear surface and the radially outward non-wear surface of the densified C/C friction disk. In various embodiments, the fifth coating is a mixture that includes a glass composition in glass frit or powder form, at least one surfactant, at least one ammonium phosphate, or at least one metal phosphate, or a mixture thereof, and the carrier fluid.

In various embodiments, a thickness of each of the first coating, the second coating, and the fifth coating is 0.0002 inches (0.000508 centimeter) and 0.003 inches (0.00762 centimeter) thick. In various embodiments, the third coating and the fourth coating are penetrating coatings.

Also disclosed herein is a densified carbon/carbon (C/C) friction disk with oxidation protection and wear improvement. The densified C/C friction disk includes a densified C/C friction core; a first coating, where the first coating is applied to a radially inward non-wear surface and a radially outward non-wear surface of the densified C/C friction core; and a second coating, where the second coating is applied to the radially inward non-wear surface, the radially outward non-wear surface, and the wear surfaces of the densified C/C friction core.

In various embodiments, the first coating is a mixture including boron carbide ($B_4C$) powder, surfactants, and a carrier fluid. In various embodiments, the carrier fluid is at least one of water, isopropyl alcohol, or hexane. In various embodiments, the second coating is a mixture including aluminum (Al), silicon (Si), a solvent, and a carrier fluid. In various embodiments, the solvent is at least one of water, methyltrimethoxysilane, hexane, isopropyl alcohol, or polyvinyl alcohol.

In various embodiments, the densified C/C friction disk further includes a third coating. In various embodiments, the third coating is applied to the radially inward non-wear surface and the radially outward non-wear surface of the densified C/C friction core. In various embodiments, the third coating is a mixture of aluminum oxide ($Al_2O_3$) and a carrier fluid.

In various embodiments, the densified C/C friction disk further includes a fourth coating. In various embodiments, the fourth coating is applied to the radially inward non-wear surface and the radially outward non-wear surface of the densified C/C friction core. In various embodiments, the fourth coating is a mixture of at least one of a phosphoric acid, an aluminum phosphate, aluminum hydroxide, or aluminum oxide, and the carrier fluid.

In various embodiments, the densified C/C friction disk further includes a fifth coating. In various embodiments, the fifth coating is applied to the radially inward non-wear surface and the radially outward non-wear surface of the densified C/C friction core. In various embodiments, the fifth coating is a mixture that includes a glass composition in glass frit or powder form, at least one surfactant, at least one ammonium phosphate, or at least one metal phosphate, or a mixture thereof, and the carrier fluid.

In various embodiments, a thickness of each of the first coating, the second coating, and the fifth coating is between 0.0002 inches (0.000508 centimeter) and 0.003 inches (0.00762 centimeter) thick. In various embodiments, the third coating and the fourth coating are penetrating coatings.

Also disclosed herein is a multi-disk brake system. The multi-disk brake system includes a plurality of densified carbon/carbon (C/C) friction disks. Each densified C/C friction disk of the plurality of densified C/C friction disks includes a densified C/C friction core; a first coating, where the first coating is applied to a radially inward non-wear surface and a radially outward non-wear surface of the densified C/C friction core; and a second coating, where the second coating is applied to the radially inward non-wear surface, the radially outward non-wear surface, and the wear surfaces of the densified C/C friction core.

In various embodiments, the first coating is a mixture including boron carbide ($B_4C$) powder, surfactants, and a carrier fluid. In various embodiments, the carrier fluid is at least one of water, isopropyl alcohol, or hexane. In various embodiments, the second coating is a mixture including aluminum (Al), silicon (Si), a solvent, and a carrier fluid. In various embodiments, the solvent is at least one of water, methyltrimethoxysilane, hexane, isopropyl alcohol, or polyvinyl alcohol.

In various embodiments, the multi-disk brake system further includes a third coating. In various embodiments, the third coating is applied to the radially inward non-wear surface and the radially outward non-wear surface of the densified C/C friction core. In various embodiments, the third coating is a mixture of aluminum oxide ($Al_2O_3$) and a carrier fluid.

In various embodiments, the multi-disk brake system further includes a fourth coating. In various embodiments, the fourth coating is applied to the radially inward non-wear surface and the radially outward non-wear surface of the densified C/C friction core. In various embodiments, the fourth coating is a mixture of at least one of a phosphoric acid, an aluminum phosphate, aluminum hydroxide, or aluminum oxide, and the carrier fluid.

In various embodiments, the multi-disk brake system further includes a fifth coating. In various embodiments, the fifth coating is applied to the radially inward non-wear surface and the radially outward non-wear surface of the densified C/C friction core. In various embodiments, the fifth coating is a mixture that includes a glass composition in glass frit or powder form, at least one surfactant, at least one ammonium phosphate, or at least one metal phosphate, or a mixture thereof, and the carrier fluid.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
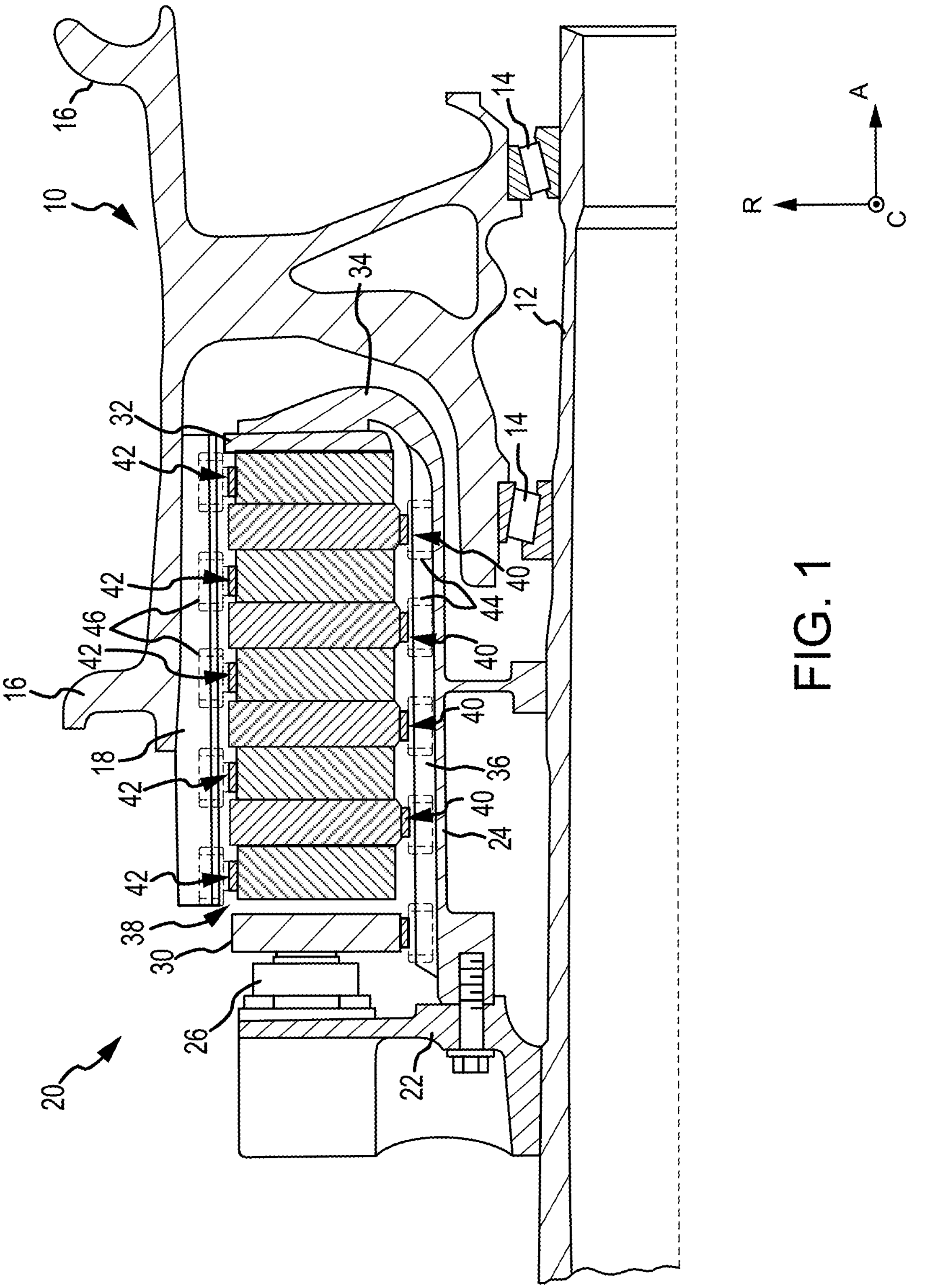
FIG. 1 illustrates a multi-disk brake system, in accordance with various embodiments.

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

As next generation oxidation protection system (OPS) technology for carbon/carbon (C/C) friction disks is developed, future replacements of C/C friction disks will include ceramics. Ceramics, which provide oxidation protection, also provide wear improvement in C/C wear debris layers. By utilizing a ceramic system, or layered combination of ceramic systems, which serve as both an OPS and wear improvement material, C/C friction disks may be fully coated to increase both landings per overhaul (LPO) and reduce oxidation fallout during overhaul. Provided herein, in accordance with various embodiments, are methods where surfaces, i.e. non-wear surfaces and wear surfaces of a densified C/C friction disk, are coated with a reaction formed OPS. In various embodiments, in the reaction formed OPS, both non-wear surfaces and wear surfaces are coated with some materials while only the non-wear surfaces are coated with other materials thereby providing oxidation protection and wear improvement for the C/C friction disk. In that regard, in various embodiments, a first coating may be applied to a radially inward non-wear surface and a radially outward non-wear surface of the densified C/C friction disk. In various embodiments, the first coating is a mixture that may include boron carbide ($B_4C$) powder, surfactants, and a carrier fluid. In various embodiments, after the first coating is applied, a second coating may be applied to the non-wear surfaces, i.e. the radially inward non-wear surface and the radially outward non-wear surface as well as the wear surfaces of the densified C/C friction disk. In various embodiments, the second coating is a mixture that may include aluminum (Al), silicon (Si), a solvent, and the carrier fluid. In various embodiments, the aluminum (Al), silicon (Si), solvent, and carrier fluid react to form the second coating. In various embodiments, after the second coating is applied, a third coating may be applied to the radially inward non-wear surface and the radially outward non-wear surface of the densified C/C friction disk. In various embodiments, the third coating is a mixture that may include aluminum oxide ($Al_2O_3$) and the carrier fluid. In various embodiments, after the third coating is applied, a fourth coating may be applied to the radially inward non-wear surface and the radially outward non-wear surface of the densified C/C friction disk. In various embodiments, the fourth coating is a mixture that may include at least one of a phosphoric acid, an aluminum phosphate, aluminum hydroxide, or aluminum oxide, and the carrier fluid. In various embodiments, after the fourth coating is applied, a fifth coating may be applied to the radially inward non-wear surface and the radially outward non-wear surface of the densified C/C friction disk. In various embodiments, the fifth coating is a mixture that may include a glass composition in glass frit or powder form, at least one surfactant, at least one ammonium phosphate, or at least one metal phosphate, or a mixture thereof, and the carrier fluid. In various embodiments, the glass frit may be a phosphate glass frit.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof. Any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. The plurality of friction disks 38 includes at least one non-rotatable friction disk (stator) 40, and at least one rotatable friction disk (rotor) 42. Stators 40 may include a carbon/carbon (C/C) disk. Rotors 42 may include a carbon/carbon (C/C) disk. Each friction disk 38 includes an attachment structure. For example, stators 40 include a plurality of stator lugs 44 at circumferentially spaced positions around an inner circumference of stators 40, and rotors 42 include a plurality of rotor lugs 46 at circumferentially spaced positions around an outer circumference of rotors 42.

Torque flange 22 is mounted to axle 12. Torque tube 24 is bolted to torque flange 22 such that reaction plate 34 is near an axial center of wheel 10. End plate 32 is connected to a surface of reaction plate 34 facing axially away from the axial center of wheel 10. Thus, end plate 32 is non-rotatable by virtue of its connection to torque tube 24. Stator splines 36 may support the pressure plate 30 such that pressure plate 30 is also non-rotatable. Stator splines 36 also support the stators 40. Stators 40 engage stator splines 36 with gaps formed between stator lugs 44. Similarly, rotors 42 engage rotor splines 18 with gaps formed between rotor lugs 46. Thus, rotors 42 are rotatable by virtue of their engagement with rotor splines 18 of wheel 10.

In various embodiments, rotors 42 are arranged with end plate 32 on one end, pressure plate 30 on the other end, and stators 40 interleaved such that rotors 42 are adjacent to non-rotatable friction components. Pistons 26 are connected to torque flange 22 at circumferentially spaced positions around torque flange 22. Pistons 26 face axially toward wheel 10 and contact a side of pressure plate 30 opposite rotors 42. Pistons 26 may be powered electrically, hydraulically, or pneumatically. In response to actuation of pistons 26, a force towards reaction plate 34 is exerted on friction disks 38 such that rotors 42 and stators 40 are pressed together between pressure plate 30 and end plate 32.

Figure 2:
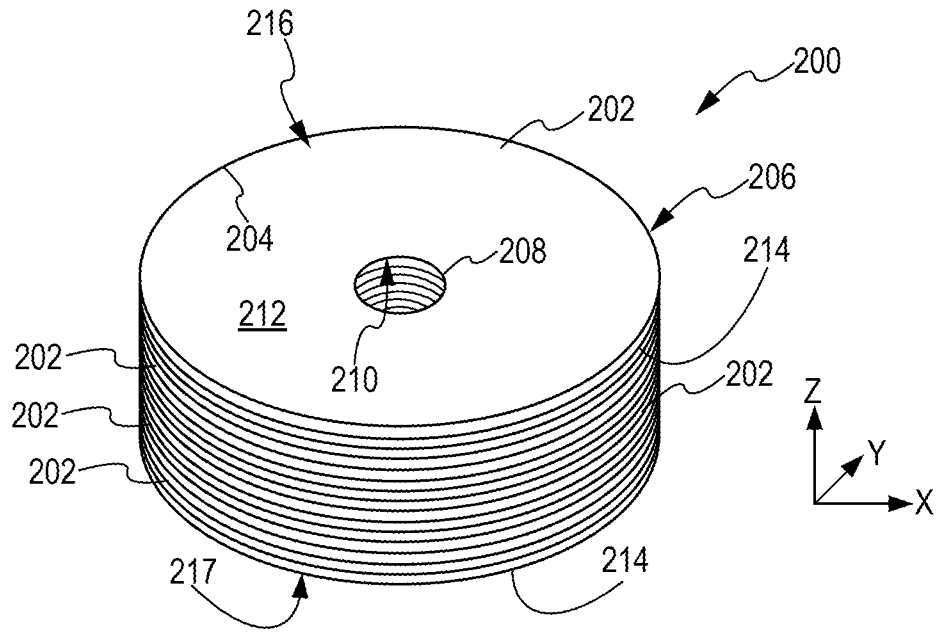
FIG. 2 illustrates a fibrous preform utilized to manufacture a carbon/carbon (C/C) disk, in accordance with various embodiments.

Referring now to FIG. 2, in accordance with various embodiments, a fibrous preform 200 utilized to manufacture a carbon/carbon (C/C) disk is illustrated. Fibrous preform 200 may be employed to form a stator 40 or a rotor 42, as described above. Fibrous preform 200 may include a porous structure including of a plurality of stacked textile layers 202. Each textile layer 202 having a thickness in a first dimension (i.e., the Z-direction) that may be substantially less than a thickness of the layer 202 in the other two dimensions (i.e., the X-direction and the Y-direction). As used herein, the "in-plane" direction refers to directions parallel to the thicker two dimensions (i.e., parallel to the X and Y directions and perpendicular to the Z-direction).

A porous structure may include any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be pre-oxidized PAN or fully carbonized commercial carbon fiber. Fibrous preform 200 may be prepared by needling the textile layers 202 of fibrous preform 200. Needling the textile layers 202 of fibrous preform 200 tends to push fibers from one layer 202 to the next layer 202, thereby forming z-fibers that extend axially across the layers 202. Needling pulls fibers from the in-plane direction and forces the fibers into the z-fiber direction. After needling, fibrous preform 200 may include fibers extending in three different directions: the radial direction, the circumferential direction, and the axial direction (or the X, Y, and Z directions).

Fibrous preform 200 may be fabricated using a net shape preforming technology or may be cut from a needled board. Fibrous preform 200 may be a lay-up of woven, braided or knitted textile layers 202. The fibrous material may be in the form of chopped carbon fibers molded to form layers 202. Prior to the densification process, the fibrous material may be formed into a preform having any desired shape or form. For example, the fibrous preform may be in the form of a disk having any shape such as, for example, a polygon, a cylinder, a triangle, annular, square, rectangle, pentagon, hexagon, octagon, or the like. In various embodiments, layers 202 and fibrous preform 200 may have a generally annular shape. In accordance with various embodiments, the outer circumferential (or outer perimeter) surfaces 204 of layers 202 may form an outer diameter (OD) 206 of fibrous preform 200, and the inner circumferential (or inner perimeter) surfaces 208 of layers 202 may form an inner diameter (ID) 210 of fibrous preform 200. Each layer 202 includes a first axial face 212 and a second axial face 214 opposite the first axial face 212. First and second axial faces 212, 214 extend from outer circumferential surface 204 to inner circumferential surface 208. Layers 202 are stacked such that the first axial face 212 of one layer 202 is oriented toward the second axial face 214 of the adjacent layer 202. First axial face 212 of the uppermost layer 202 forms the upper axial end 216 of fibrous preform 200 and the second axial face 214 of the bottommost layer 202 forms the lower axial end 217 of fibrous preform 200 (i.e., the two layers 202 that are farther apart from one another in the axial direction form the axial ends 216, 217 of the fibrous preform).

Figure 3:
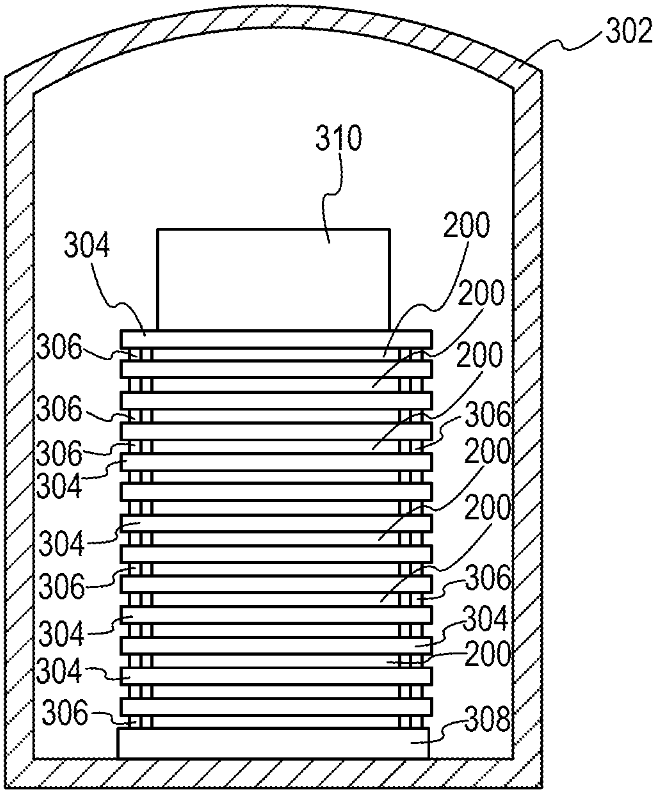
FIG. 3 illustrates a fibrous preform utilized to manufacture a carbon/carbon (C/C) disk in a carbonization furnace, in accordance with various embodiments.

As shown in FIG. 3, in accordance with various embodiments, fibrous preform 200 utilized to manufacture a carbon/carbon (C/C) disk being placed in a carbonization furnace 302 for carbonization is illustrated. The carbonization process may be employed to convert the fibers of the fibrous preforms 200 into pure carbon fibers, as used herein only "pure carbon fibers" means carbon fibers comprised of at least 99% carbon. The carbonization process is distinguished from the densification process described below in that the densification process involves infiltrating the pores of the fibrous preform 200 and depositing a matrix (e.g., carbon, phenolic resin, or any other desired matrix material) within and around the carbon fibers of the fibrous preform, and the carbonization process refers to the process of converting the fibers of the fibrous preform 200 into pure carbon fibers.

In various embodiments, a plurality of fibrous preforms 200 may be placed on top of one another with separator plates 304 and spacing stops 306 disposed between adjacent fibrous preforms 200. For example, the bottommost fibrous preform 200 may be placed on a base plate 308 at the bottom of carbonization furnace 302. A separator plate 304 may be placed on top of the bottommost fibrous preform 200. Another fibrous preform 200 may then be placed on the separator plate 304, and another separator plate 304 may be placed on that fibrous preform 200. A stack of fibrous preforms 200 and separator plates 304 may be constructed in this manner, with each fibrous preform 200 being separated from superjacent and subjacent fibrous preforms 200 by separator plates 304. Spacing stops 306 may be placed between each of the separator plates 304. The spacing stops 306 may include a height that is less than the thickness of the fibrous preform 200 prior to carbonization. Spacing stops 306 may define a target thickness of the fibrous preform 200 after carbonization. In that regard, after the stack of fibrous preforms 200 is constructed, and before the carbonization process has started, gaps may exist between the spacing stops 306 and adjacent separator plates 304. During carbonization, a compressive load may be applied to the fibrous preforms 200, thereby compressing the fibrous preforms 200 until spacing stops 306 contact adjacent separator plates 304.

In various embodiments, compressive pressure may be applied to fibrous preforms 200 during the carbonization. The compressive pressure may be applied by placing a weight 310 over fibrous preforms 200, or by applying a compressive load to the fibrous preforms 200 by other suitable means. The compressive pressure may be applied along the direction of the z-fibers. It will be appreciated by those skilled in the art that the mass of weight 310 and/or the compressive force generated by weight 310 may vary depending on the size of fibrous preforms 200, the pre-carbonization fiber volume of fibrous preforms 200, the desired post-carbonization fiber volume of fibrous preforms 200, and/or the number fibrous preforms 200 being compressed. As used herein, "fiber volume" refers the percentage of the total volume of the fibrous preform that is formed by the fibers of the fibrous preform. For example, a fiber volume of 18% means the fibers of the fibrous preform form 18% of the total volume of fibrous preform. In various embodiments, after carbonization, fibrous preform 200 includes a fiber volume of between 10% and 50%. In various embodiments, after carbonization, fibrous preform 200 includes a fiber volume of between 15% and 25%. In various embodiments, fibrous preforms 200 having a low fiber volume may be desirable for the infiltration methods disclosed herein. In various embodiments, after carbonization, fibrous preform 200 may include a fiber volume of less than 25%. For example, in various embodiments, after carbonization, fibrous preform 200 may include a fiber volume of 21% or, in various embodiments, fibrous preform 200 may include a fiber volume of 18%. In various embodiments, the carbonized fibrous preform 200 is then densified via chemical vapor infiltration (CVI) with pyrolytic carbon at a predetermined temperature for a predetermined time interval as is known in the art, which results in a finished C/C disk.

Figure 4A:
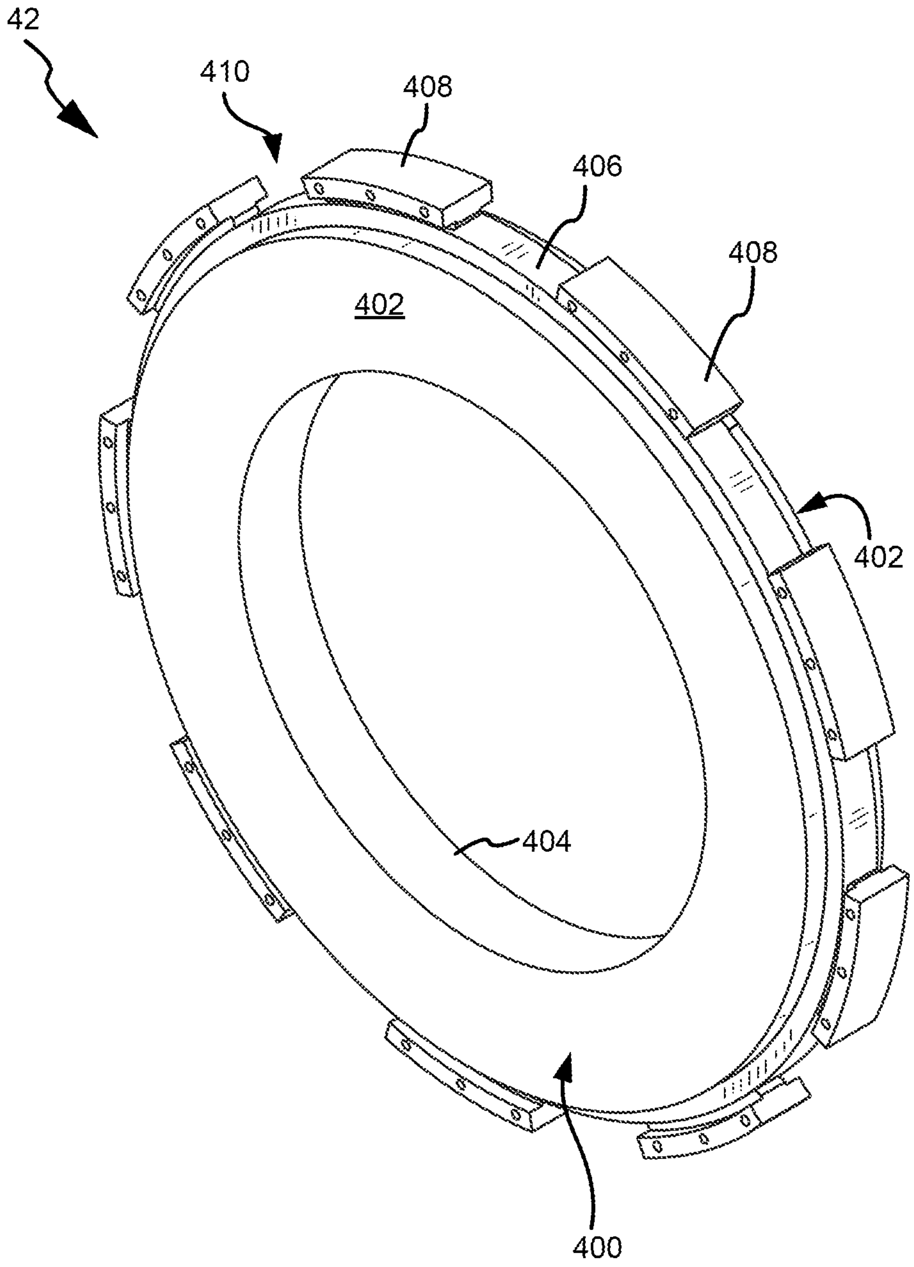
FIG. 4A illustrates an assembled rotor coated with a reaction formed oxidation protection system (OPS), in accordance with various embodiments.

Referring to FIG. 4A, in accordance with various embodiments, an assembled rotor 42 coated with a reaction formed oxidation protection system (OPS) is illustrated. Rotor 42, which is a densified C/C friction disk, includes a rotor core 400 with wear surfaces 402, a radially inward non-wear surface 404, and a radially outward non-wear surface 406. Rotor core 400 may include one or more rotor lugs 408. Rotor core 400 may engage rotor splines 18 (FIG. 1) in rotor gaps 410 formed between rotor lugs 408.

Figure 4B:
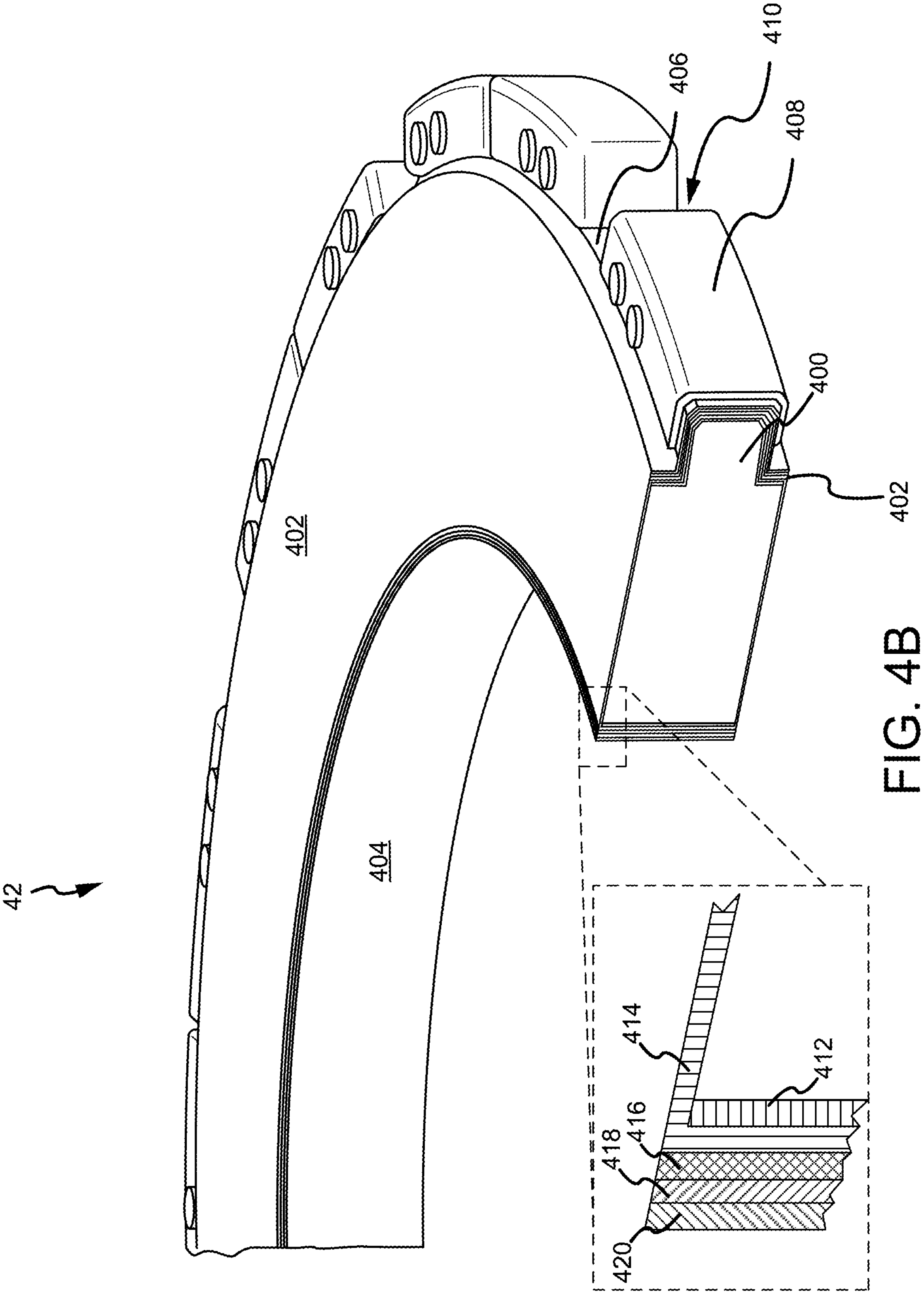
FIG. 4B illustrates a cutaway view of an assembled rotor coated with a reaction formed oxidation protection system (OPS), in accordance with various embodiments.

Referring to FIG. 4B, in accordance with various embodiments, a cutaway view of assembled rotor 42 coated with a reaction formed oxidation protection system (OPS) is illustrated. Rotor 42 includes a rotor core 400 with wear surfaces 402, a radially inward non-wear surface 404, and a radially outward non-wear surface 406. Rotor core 400 may include one or more rotor lugs 408. Rotor core 400 may engage rotor splines 18 (FIG. 1) in rotor gaps 410 formed between rotor lugs 408. In accordance with various embodiments, the rotor core 400, i.e. a densified C/C friction disk, may be coated with a reaction formed oxidation protection system (OPS). In various embodiments, a first coating 412 may be applied to the radially inward non-wear surface 404 and the radially outward non-wear surface 406 of the rotor core 400. In various embodiments, the first coating 412 is a mixture that may include boron carbide ($B_4C$) powder, surfactants, and a carrier fluid. In various embodiments, the surfactant may include a binder and a dispersant. In various embodiments, the carrier fluid may be water, isopropyl alcohol, or hexane, among others. In various embodiments, the first coating 412 may be applied to the composite structure in any suitable manner, such as spraying or brushing, among others, and then dried to form a boron compound layer. In various embodiments, after the first coating 412 is applied, a second coating 414 may be applied to the non-wear surfaces, i.e. the radially inward non-wear surface 404 and the radially outward non-wear surface 406 as well as the wear surfaces 402 of the rotor core 400. In various embodiments, the second coating 414 is a mixture that may include aluminum (Al), silicon (Si), a solvent, and the carrier fluid. In various embodiments, the solvent may be water, methyltrimethoxysilane, hexane, isopropyl alcohol, or polyvinyl alcohol, among others. In various embodiments, the aluminum (Al), silicon (Si), solvent, and carrier fluid may be heated (e.g., dried or baked) at a temperature in range from 500° C. (932° F.) to 1500° C. (2732° F.) to form the second coating. In various embodiments, the composite structure may be heated to a temperature in a range from 500° C. (932° F.) to 1200° C. (2192° F.), or between 600° C. (1112° F.) to 1100° C. (2012° F.). In various embodiments, the composite structure may be heated to, or at least to, 1000° C. (1832° F.) or to, or at least to, 600° C. (1112° F.).

In various embodiments, after the second coating 414 is applied, a third coating 416 may be applied to the radially inward non-wear surface 404 and the radially outward non-wear surface 406 of the rotor core 400. In various embodiments, the third coating 416 is a mixture that may include aluminum oxide ($Al_2O_3$) and the carrier fluid. In various embodiments, the aluminum oxide may include an additive, such as a nanoparticle dispersion of aluminum oxide. The third coating 416 may further include a surfactant or a wetting agent. The composite structure may be porous, allowing the pretreating composition to penetrate at least a portion of the pores of the composite structure. In various embodiments, after applying the third coating, the component may be heated to remove water and fix the aluminum oxide in place. For example, the component may be heated between 100° C. (212° F.) and 200° C. (392° F.), and further, between 100° C. (212° F.) and 150° C. (302° F.). In various embodiments, the third coating 416 may be a penetrating coating. In various embodiments, after the third coating 416 is applied, a fourth coating 418 may be applied to the radially inward non-wear surface 404 and the radially outward non-wear surface 406 of the rotor core 400. In various embodiments, the fourth coating 418 may include at least one of a phosphoric acid, an aluminum phosphate, aluminum hydroxide, or aluminum oxide. In various embodiments, the fourth coating 418 may include a second metal salt such as a magnesium salt. In various embodiments, the aluminum to phosphorus molar ratio of the aluminum phosphate is 1 to 3 or less. In various embodiments, the fourth coating 418 may include a surfactant or a wetting agent. In various embodiments, the fourth coating 418 may be applied to the composite structure atop the third coating 416. In various embodiments, the composite structure may then be heated. In various embodiments, the composite structure may be heated between 600° C. (1112° F.) and 800° C. (1472° F.), and further, between 650° C. (1202° F.) and 750° C. (1382° F.). In various embodiments, the fourth coating 418 may be a penetrating coating.

In various embodiments, after the fourth coating 418 is applied, a fifth coating 420 may be applied by spraying or brushing the slurry to the radially inward non-wear surface 404 and the radially outward non-wear surface 406 of the rotor core 400. In various embodiments, the fifth coating 420 is a mixture that may include a glass composition in glass frit or powder form, at least one surfactant, at least one ammonium phosphate, or at least one metal phosphate, or a mixture thereof, and the carrier fluid. In various embodiments, the glass composition may be represented by the formula $a(A'_2O)_x(P_2O_5)_{y1}b(G_1O)_{y2}c(A''O)_z$, where: A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, prascodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to 5; b is a number in the range from 0 to 10; c is a number in the range from 0 to 30; x is a number in the range from 0.050 to 0.500; y1 is a number in the range from 0.040 to 0.950; y2 is a number in the range from 0 to 0.20; and z is a number in the range from 0.01 to 0.5; $(x+y1+y2+z)=1$; and $x<(y1+y2)$.

In various embodiments, the composite structure may be heated to form a sealing layer including phosphate glass over the ceramic layer. The composite structure may be heated (e.g., dried or baked) at a temperature in the range from 200° C. (392° F.) to 1000° C. (1832° F.). In various embodiments, the composite structure is heated to a temperature in a range from 600° C. (1112° F.) to 1000° C. (1832° F.), or between 200° C. (392° F.) to 900° C. (1652° F.), or further, between 400° C. (752° F.) to 850° C. (1562° F.). In various embodiments, the composite structure may be heated for a period between about 0.5 hour and about 8 hours, wherein the term "about" in this context only means plus or minus 0.25 hours. In various embodiments, the sealing layer may also be referred to as a coating. In various embodiments, the composite structure may be heated to a first, lower temperature (for example, 30° C. (86° F.) to 400° C. (752° F.)) to bake or dry the sealing layer at a controlled depth. In various embodiments, a second, higher temperature (for example, 300° C. (572° F.) to 1000° C. (1832° F.)) may then be used to melt the phosphate glass composition, creating a substantially uniform sealing layer over the ceramic layer. In various embodiments, the duration of each heating may be determined as a fraction of the overall heating time and may range from about 10% to about 50%, wherein the term "about" in this context only means plus or minus 5%. In various embodiments, the duration of the lower temperature heating step(s) may range from about 20% to about 40% of the overall heating time, wherein the term "about" in this context only means plus or minus 5%. In various embodiments, the lower temperature step(s) may occupy a larger fraction of the overall heating time, for example, to provide relatively slow heating up to and through the first lower temperature. In various embodiments, the exact heating profile will depend on a combination of the first temperature and desired depth of the drying portion. In various embodiments, the heating may be performed in an inert environment, such as under a blanket of inert gas or less reactive gas (e.g., nitrogen, argon, other noble gases, and the like). For example, a composite structure may be pretreated or warmed prior to application of the sealing slurry to aid in the penetration of the sealing slurry. In various embodiments, the heating may be for a period of about 2 hours at a temperature of about 600° C. (1112° F.) to about 900° C. (1652° F.), wherein the term "about" in this context only means plus or minus 50° C. (122° F.). The composite structure and the sealing slurry may then be dried or baked in a non-oxidizing, inert or less reactive atmosphere, e.g., noble gasses and/or nitrogen (N2), to optimize the retention of the sealing pre-slurry composition of the sealing slurry and resulting sealing layer filling any pores or cracks in the ceramic layer. This retention may, for example, be improved by heating the composite structure to about 200° C. (392° F.) and maintaining the temperature for about 1 hour before heating the carbon-carbon composite to a temperature in the range described above. The temperature rise may be controlled at a rate that removes water without boiling, and provides temperature uniformity throughout the composite structure.

In various embodiments, a thickness of each of the first coating 412, the second coating 414, and the fifth coating 420 may be between 0.0002 inches (0.000508 centimeter) and 0.003 inches (0.00762 centimeter) thick. In various embodiments, a thickness of each of the first coating 412, the second coating 414, the third coating 416, the fourth coating 418, and the fifth coating 420 may be between 0.0003 inches (0.000762 centimeter) and 0.005 inches (0.0127 centimeter) thick. In various embodiments, a thickness of each of the first coating 412, the second coating 414, the third coating 416, the fourth coating 418, and the fifth coating 420 may be between 0.0007 inches (0.001778 centimeter) and 0.007 inches (0.01778 centimeter) thick. In various embodiments, the third coating 416 and the fourth coating 418 may be penetrating coatings and thus, have a substantially zero thickness.

Figure 5:
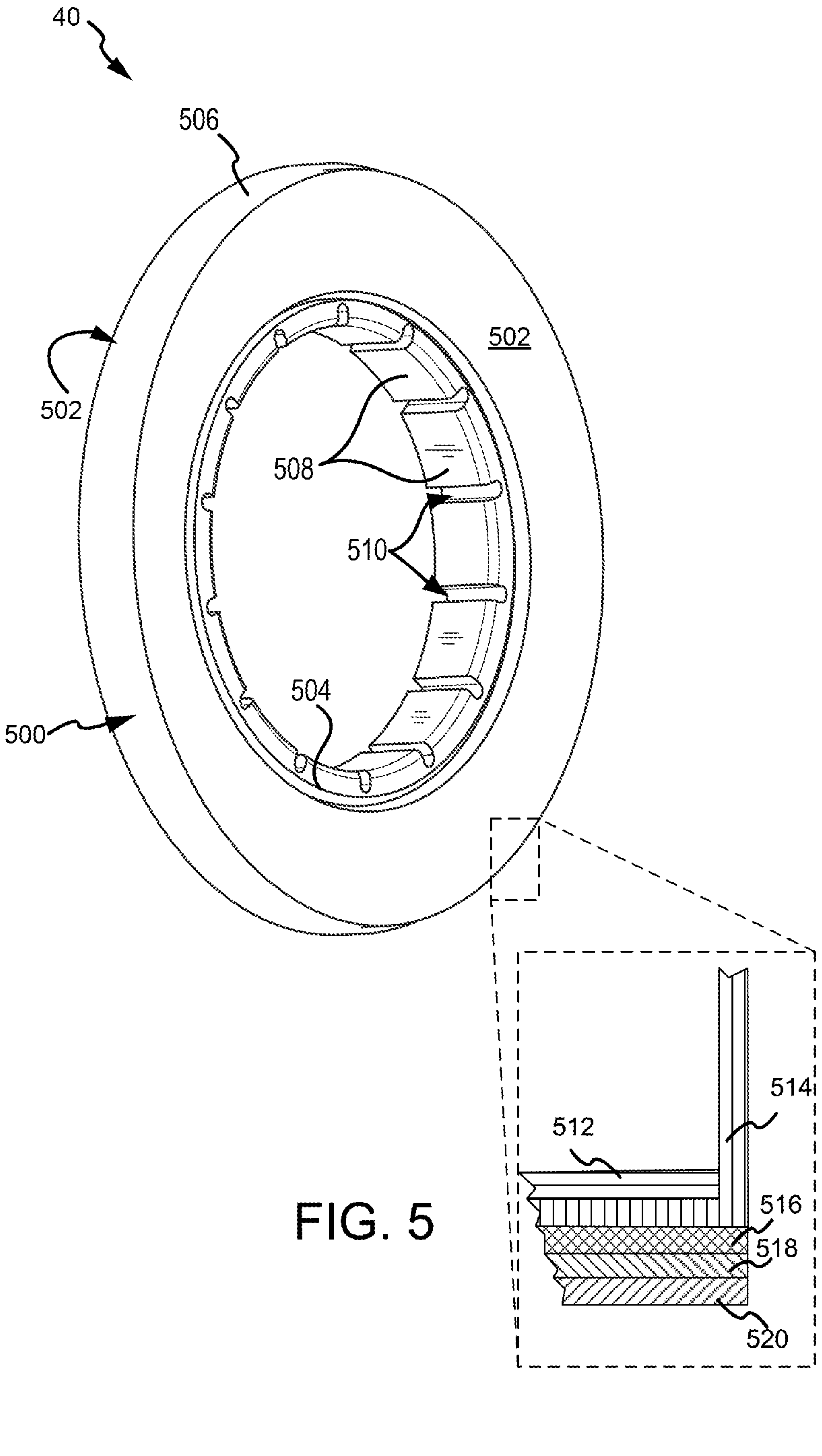
FIG. 5 illustrates an assembled stator coated with a reaction formed oxidation protection system (OPS), in accordance with various embodiments.

Referring to FIG. 5, an assembled stator 40 coated with a reaction formed oxidation protection system (OPS) is illustrated, in accordance with various embodiments. Stator 40 may include a stator core 500 with wear surfaces 502, a radially inward non-wear surface 504, and a radially outward non-wear surface 506. Stator core 500 may include stator lugs 508. Stator lugs 508 may be located along the radially inward non-wear surface 504. Stator gaps 510 may be located between stator lugs 508. Stator gaps 510 may be positioned to align with stator splines 36 (FIG. 1). The engagement between the stator splines 36 and stator lugs 508 may prevent stator core 500 from rotating in response to a torque being applied to stator 40 during braking. Stator core 500 may include opposing first and second surfaces extending between the radially inward non-wear surface 504 and the radially outward non-wear surface 506.

In accordance with various embodiments, the stator core 500, i.e. a densified C/C friction disk, may be coated with a reaction formed oxidation protection system (OPS). In various embodiments, a first coating 512 may be applied to the radially inward non-wear surface 504 and the radially outward non-wear surface 506 of the stator core 500. In various embodiments, the first coating 512 is a mixture that may include boron carbide ($B_4C$) powder, surfactants, and a carrier fluid. In various embodiments, the surfactant may include a binder and a dispersant. In various embodiments, the carrier fluid may be water, isopropyl alcohol, or hexane, among others. In various embodiments, after the first coating 512 is applied, a second coating 514 may be applied to the non-wear surfaces, i.e. the radially inward non-wear surface 504 and the radially outward non-wear surface 506 as well as the wear surfaces 502 of the stator core 500. In various embodiments, the second coating 514 is a that may include including aluminum (Al), silicon (Si), a solvent, and the carrier fluid. In various embodiments, the solvent may be water, methyltrimethoxysilane, hexane, isopropyl alcohol, or polyvinyl alcohol, among others. In various embodiments, the aluminum (Al), silicon (Si), solvent, and carrier fluid react to form the second coating. In various embodiments, after the second coating 514 is applied, a third coating 516 may be applied to the radially inward non-wear surface 504 and the radially outward non-wear surface 506 of the stator core 500. In various embodiments, the third coating 516 is a mixture that may include aluminum oxide ($Al_2O_3$) and the carrier fluid. In various embodiments, the third coating 516 may be a penetrating coating. In various embodiments, after the third coating 516 is applied, a fourth coating 518 may be applied to the radially inward non-wear surface 504 and the radially outward non-wear surface 506 of the stator core 500. In various embodiments, the fourth coating 518 is a mixture that may include at least one of a phosphoric acid, an aluminum phosphate, aluminum hydroxide, or aluminum oxide, and the carrier fluid. In various embodiments, the fourth coating 518 may be a penetrating coating. In various embodiments, after the fourth coating 518 is applied, a fifth coating 520 may be applied to the radially inward non-wear surface 504 and the radially outward non-wear surface 506 of the stator core 500. In various embodiments, the fifth coating 520 is a mixture that may include a glass composition in glass frit or powder form, at least one surfactant, at least one ammonium phosphate, or at least one metal phosphate, or a mixture thereof, and the carrier fluid. In various embodiments, the glass frit may be a phosphate glass frit.

In various embodiments, a thickness of each of the first coating 512, the second coating 514, and the fifth coating 520 may be 0.0002 inches (0.000508 centimeter) and 0.003 inches (0.00762 centimeter) thick. In various embodiments, a thickness of each of the first coating 512, the second coating 514, and the fifth coating 520 may be between 0.13 inches (0.3302 centimeters) and 0.22 inches (0.5588 centimeters) thick. In various embodiments, a thickness of each of the first coating 512, the second coating 514, and the fifth coating 520 may be between 0.15 inches (0.381 centimeter) and 0.20 inches (0.508 centimeter) thick. In various embodiments, the third coating 516 and the fourth coating 518 may be penetrating coatings and thus, have a substantially zero thickness.

Figure 6:
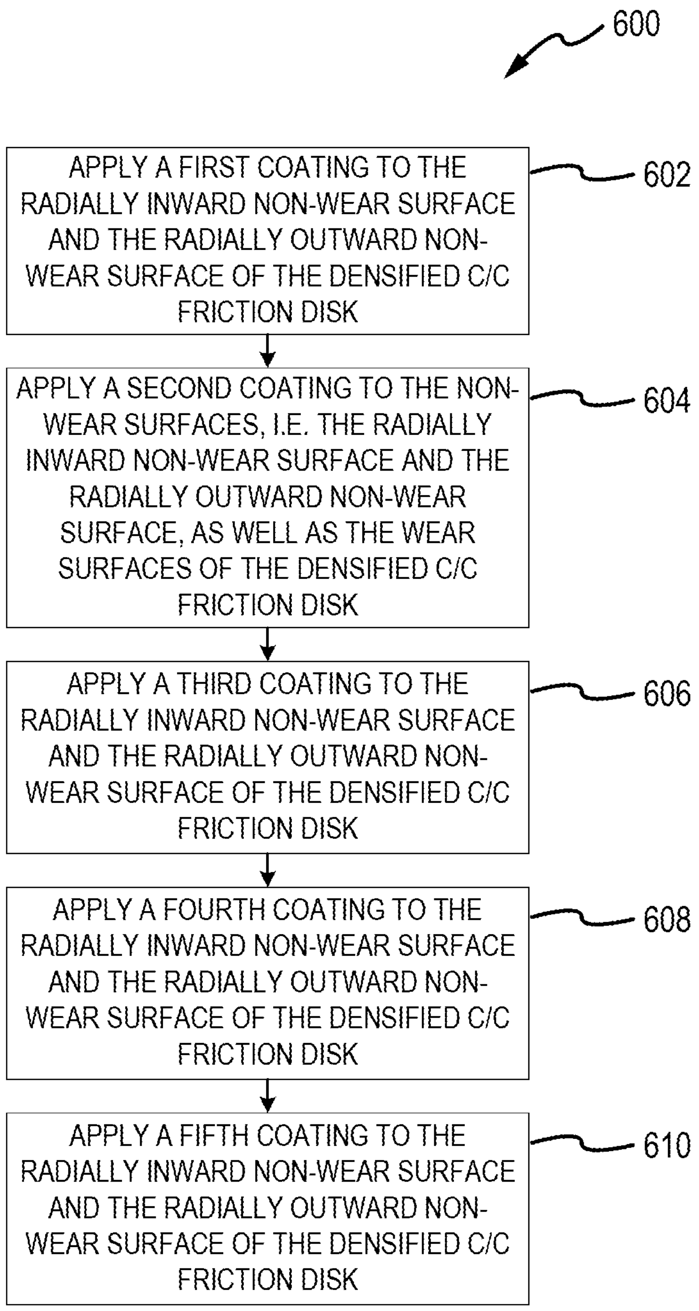
FIG. 6 illustrates a flowchart of a method for providing oxidation protection and wear improvement for C/C friction disk by coating a densified C/C friction disk with a reaction formed oxidation protection system (OPS), in accordance with various embodiments.

Referring now to FIG. 6, in accordance with various embodiments, a flowchart of a method 600 for providing oxidation protection and wear improvement for C/C friction disk by coating a densified C/C friction disk with a reaction formed oxidation protection system (OPS) is illustrated. In various embodiments, at block 602, a first coating is applied to the radially inward non-wear surface and the radially outward non-wear surface of the densified C/C friction disk. In various embodiments, the first coating is a mixture that may include boron carbide ($B_4C$) powder, surfactants, and a carrier fluid. In various embodiments, the surfactant may include a binder and a dispersant. In various embodiments, the carrier fluid may be water, isopropyl alcohol, or hexane, among others. In various embodiments, at block 604, a second coating is applied to the non-wear surfaces, i.e. the radially inward non-wear surface and the radially outward non-wear surface, as well as the wear surfaces of the densified C/C friction disk. In various embodiments, the second coating is a mixture that may include aluminum (Al), silicon (Si), a solvent, and the carrier fluid. In various embodiments, the solvent may be water, methyltrimethoxysilane, hexane, isopropyl alcohol, or polyvinyl alcohol, among others. In various embodiments, the aluminum (Al), silicon (Si), solvent, and carrier fluid react to form the second coating. In various embodiments, at block 606, a third coating is applied to the radially inward non-wear surface and the radially outward non-wear surface of the densified C/C friction disk. In various embodiments, the third coating is a mixture that may include aluminum oxide ($Al_2O_3$) and the carrier fluid. In various embodiments, the third coating may be a penetrating coating. In various embodiments, at block 608, a fourth coating is applied to the radially inward non-wear surface and the radially outward non-wear surface of the densified C/C friction disk. In various embodiments, the fourth coating is a mixture that may include at least one of a phosphoric acid, an aluminum phosphate, aluminum hydroxide, or aluminum oxide, and the carrier fluid. In various embodiments, the fourth coating may be a penetrating coating. In various embodiments, at block 610, a fifth coating is applied to the radially inward non-wear surface and the radially outward non-wear surface of the densified C/C friction disk. In various embodiments, the fifth coating is a mixture that may include a glass composition in glass frit or powder form, at least one surfactant, at least one ammonium phosphate, or at least one metal phosphate, or a mixture thereof, and the carrier fluid. In various embodiments, the glass frit may be a phosphate glass frit.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for providing oxidation protection and wear improvement for a densified carbon/carbon (C/C) friction disk, the method comprising:

applying a first coating to a radially inward non-wear surface and a radially outward non-wear surface of the densified C/C friction disk;

applying a second coating to the radially inward non-wear surface, the radially outward non-wear surface, and wear surfaces of the densified C/C friction disk;

applying a third coating to the radially inward non-wear surface and the radially outward non-wear surface of the densified C/C friction disk; and applying a fourth coating to the radially inward non-wear surface and the radially outward non-wear surface of the densified C/C friction disk.

2. The method of claim 1, wherein the first coating is a mixture including boron carbide ($B_4C$) powder, surfactants, and a carrier fluid, wherein the carrier fluid is at least one of water, isopropyl alcohol, or hexane.

3. The method of claim 1, wherein the second coating is a mixture including aluminum (Al), silicon (Si), a solvent, and a carrier fluid and wherein the solvent is at least one of water, methyltrimethoxysilane, hexane, isopropyl alcohol, or polyvinyl alcohol.

4. The method of claim 1, wherein the third coating is a mixture of aluminum oxide ($Al_2O_3$) and a carrier fluid.

5. The method of claim 4, wherein the fourth coating is a mixture of at least one of a phosphoric acid, an aluminum phosphate, aluminum hydroxide, or aluminum oxide, and the carrier fluid.

6. The method of claim 5, further comprising:

applying a fifth coating to the radially inward non-wear surface and the radially outward non-wear surface of the densified C/C friction disk, wherein the fifth coating is a mixture that includes a glass composition in glass frit or powder form, at least one surfactant, at least one ammonium phosphate, or at least one metal phosphate, or a mixture thereof, and the carrier fluid.

7. The method of claim 6, wherein a thickness of each of the first coating, the second coating, and the fifth coating is between 0.0002 inches (0.000508 centimeter) and 0.003 inches (0.00762 centimeter) thick and wherein the third coating and the fourth coating are penetrating coatings.

8. A densified carbon/carbon (C/C) friction disk with oxidation protection and wear improvement, the densified C/C friction disk comprising:

a densified C/C friction core;

a first coating, wherein the first coating is applied to a radially inward non-wear surface and a radially outward non-wear surface of the densified C/C friction core;

a second coating, wherein the second coating is applied to the radially inward non-wear surface, the radially outward non-wear surface, and wear surfaces of the densified C/C friction core;

a third coating, wherein the third coating is applied to the radially inward non-wear surface and the radially outward non-wear surface of the densified C/C friction core; and a fourth coating, wherein the fourth coating is applied to the radially inward non-wear surface and the radially outward non-wear surface of the densified C/C friction core.

9. The densified C/C friction disk of claim 8, wherein the first coating is a mixture including boron carbide ($B_4C$) powder, surfactants, and a carrier fluid, and wherein the carrier fluid is at least one of water, isopropyl alcohol, or hexane.

10. The densified C/C friction disk of claim 8, wherein the second coating is a mixture including aluminum (Al), silicon (Si), a solvent, and a carrier fluid and wherein the solvent is at least one of water, methyltrimethoxysilane, hexane, isopropyl alcohol, or polyvinyl alcohol.

11. The densified C/C friction disk of claim 8, wherein the third coating is a mixture of aluminum oxide ($Al_2O_3$) and a carrier fluid.

12. The densified C/C friction disk of claim 11, wherein the fourth coating is a mixture of at least one of a phosphoric acid, an aluminum phosphate, aluminum hydroxide, or aluminum oxide, and the carrier fluid.

13. The densified C/C friction disk of claim 12, further comprising:

a fifth coating, wherein the fifth coating is applied to the radially inward non-wear surface and the radially outward non-wear surface of the densified C/C friction core and wherein the fifth coating is a mixture that includes a glass composition in glass frit or powder form, at least one surfactant, at least one ammonium phosphate, or at least one metal phosphate, or a mixture thereof, and the carrier fluid.

14. The densified C/C friction disk of claim 13, wherein a thickness of each of the first coating, the second coating, and the fifth coating is between 0.0002 inches (0.000508 centimeter) and 0.003 inches (0.00762 centimeter) thick and wherein the third coating and the fourth coating are penetrating coatings.

15. A multi-disk brake system comprising:

a plurality of densified carbon/carbon (C/C) friction disks, each densified C/C friction disk of the plurality of densified C/C friction disks comprising:

a densified C/C friction core;

a first coating, wherein the first coating is applied to a radially inward non-wear surface and a radially outward non-wear surface of the densified C/C friction core;

a second coating, wherein the second coating is applied to the radially inward non-wear surface, the radially outward non-wear surface, and wear surfaces of the densified C/C friction core;

a third coating, wherein the third coating is applied to the radially inward non-wear surface and the radially outward non-wear surface of the densified C/C friction core; and a fourth coating, wherein the fourth coating is applied to the radially inward non-wear surface and the radially outward non-wear surface of the densified C/C friction core.

16. The multi-disk brake system of claim 15, wherein the first coating is a mixture including boron carbide ($B_4C$) powder, surfactants, and a carrier fluid, and wherein the carrier fluid is at least one of water, isopropyl alcohol, or hexane.

17. The multi-disk brake system of claim 15, wherein the second coating is a mixture including aluminum (Al), silicon (Si), a solvent, and a carrier fluid and wherein the solvent is at least one of water, methyltrimethoxysilane, hexane, isopropyl alcohol, or polyvinyl alcohol.

18. The multi-disk brake system of claim 15, wherein the third coating is a mixture of aluminum oxide ($Al_2O_3$) and a carrier fluid.

19. The multi-disk brake system of claim 18, wherein the fourth coating is a mixture of at least one of a phosphoric acid, an aluminum phosphate, aluminum hydroxide, or aluminum oxide, and the carrier fluid.

20. The multi-disk brake system of claim 19, further comprising:

a fifth coating, wherein the fifth coating is applied to the radially inward non-wear surface and the radially outward non-wear surface of the densified C/C friction core and wherein the fifth coating is a mixture that includes a glass composition in glass frit or powder form, at least one surfactant, at least one ammonium phosphate, or at least one metal phosphate, or a mixture thereof, and the carrier fluid.

* * * * *